United States Patent
Ma et al.

(10) Patent No.: US 9,804,460 B2
(45) Date of Patent: Oct. 31, 2017

(54) PIXEL ELECTRODE, ARRAY SUBSTRATE AND DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Yangzhao Ma, Xiamen (CN); Poping Shen, Xiamen (CN); Ling Wu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 15 days.

(21) Appl. No.: 14/869,555

(22) Filed: Sep. 29, 2015

(65) Prior Publication Data

US 2016/0187749 A1    Jun. 30, 2016

(30) Foreign Application Priority Data

Dec. 24, 2014   (CN) .......................... 2014 1 0814863

(51) Int. Cl.
*G02F 1/1343*   (2006.01)
*G02F 1/1362*   (2006.01)

(52) U.S. Cl.
CPC .. *G02F 1/136213* (2013.01); *G02F 1/134309* (2013.01); *G02F 1/134363* (2013.01); *G02F 2001/134345* (2013.01)

(58) Field of Classification Search
CPC ..................... G02F 1/134309; G02F 1/134363
See application file for complete search history.

(56) References Cited

U.S. PATENT DOCUMENTS

| 8,570,261 B2 | 10/2013 | Gu et al. |
| 2009/0273750 A1 | 11/2009 | Liao et al. |
| 2010/0182523 A1 | 7/2010 | Woo et al. |

(Continued)

FOREIGN PATENT DOCUMENTS

| CN | 101783353 A | 7/2010 |
| CN | 103713431 A | 4/2014 |

(Continued)

OTHER PUBLICATIONS

Chinese Application No. 201410814863.2, First Office Action dated Nov. 2, 2016.

*Primary Examiner* — Kendrick Hsu
(74) *Attorney, Agent, or Firm* — Alston & Bird LLP (57) ABSTRACT

A pixel electrode, an array substrate and a display panel are provided. The pixel electrode includes: a main pixel electrode extending in a first direction and a first extending portion. The main pixel electrode includes a main electrode, and a first end portion and a second end portion respectively located at two ends of the main electrode. The first extending portion extends in a second direction and is connected to the first end portion. The second direction intersects with the first direction. In addition to the main pixel electrode, the pixel electrode further includes the first extending portion electrically connected to the first end portion of the main pixel electrode. The area of the pixel electrode is increased due to the arrangement of the extending portion.

17 Claims, 7 Drawing Sheets

(56) References Cited

U.S. PATENT DOCUMENTS

| | | | |
|---|---|---|---|
| 2013/0114033 A1* | 5/2013 | Kuji | G02F 1/134309 349/143 |
| 2013/0128176 A1 | 5/2013 | Hirosawa | |
| 2014/0063429 A1* | 3/2014 | Huh | G02F 1/133707 349/139 |
| 2014/0098319 A1 | 4/2014 | Jeon et al. | |
| 2014/0118649 A1* | 5/2014 | Hirosawa | G02F 1/134309 349/41 |
| 2014/0247411 A1 | 9/2014 | Kim et al. | |
| 2015/0219973 A1 | 8/2015 | Kawashima et al. | |

FOREIGN PATENT DOCUMENTS

| | | |
|---|---|---|
| CN | 104035228 A | 9/2014 |
| WO | 2014054500 A1 | 4/2014 |

\* cited by examiner

| | two pixel electrodes | one pixel electrode | solution 1: add a first extending portion 2 | solution 2: add a first extending portion2, a second extending portion 3 and a third extending portion 4 | solution 3: add a first extending portion 2 and a second extending portion 3 |
|---|---|---|---|---|---|
| Cst(fF) | 90.056 | 85.571 | 104.292 | 110.752 | 100.705 |
| area ratio of pixel electrode | 30.25% | 29.62% | 34.76% | 36.20% | 33.51% |

PIXEL ELECTRODE, ARRAY SUBSTRATE AND DISPLAY PANEL

CROSS REFERENCE TO RELATED APPLICATIONS

The present application claims the priority to Chinese Patent Application No. 201410814863.2, entitled "PIXEL ELECTRODE, ARRAY SUBSTRATE AND DISPLAY PANEL", filed on Dec. 24, 2014 with the State Intellectual Property Office of People's Republic of China, which is incorporated herein by reference in its entirety.

FIELD OF THE DISCLOSURE

The disclosure relates to displaying technologies, and in particular, to a pixel electrode, an array substrate including the pixel electrode and a display panel including the array substrate.

BACKGROUND OF THE DISCLOSURE

With the development of displaying techniques, the number of pixels per inch in a display device increases, a distance between adjacent pixels decreases, and correspondingly, a ratio of the area of a pixel electrode over the area of the pixel decreases.

Figure 1:
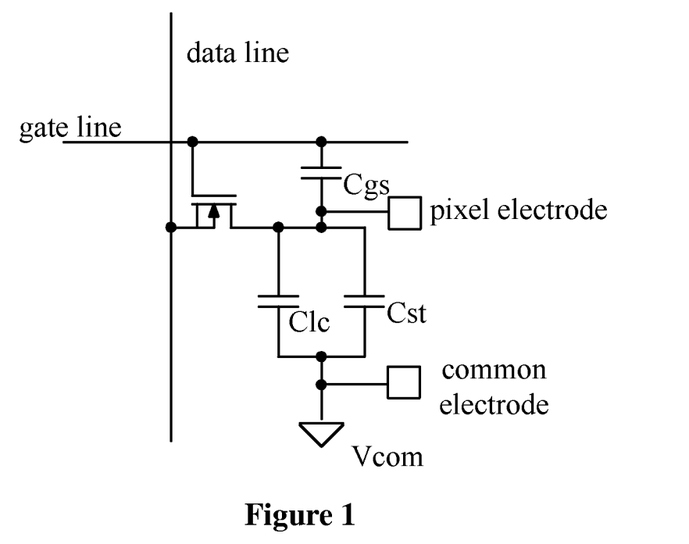
FIG. 1 schematically illustrates a principle of connections in a pixel of a TFT LCD.

Reference may be made to FIG. 1, which schematically illustrates a principle of connections within the pixel of a conventional and common TFT (Thin Film Transistor) LCD (Liquid Crystal Display). As shown in FIG. 1, a gate electrode of a thin film transistor is connected to a gate line, and the thin film transistor is controlled via the gate line to be on or off. A drain electrode of the thin film transistor is connected to a data line, a source electrode of the thin film transistor is connected to a pixel electrode, and a driving signal is provided to the pixel electrode via the data line when the thin film transistor is turned on. A parasitic capacitor Cgs is generated between the gate electrode and the source electrode of the thin film transistor, i.e. the pixel electrode is connected to the gate line via the parasitic capacitor Cgs. A liquid crystal capacitor Clc and a storage capacitor Cst are connected in parallel between the pixel electrode and a common electrode. At instants when the thin film transistor is turned on and turned off, variation of a voltage of the gate line may affect a voltage of the pixel electrode via the parasitic capacitor Cgs, and a feed though voltage is generated on the pixel electrode, thereby affecting the quality of displayed images. A formula for calculating the feed though voltage is as follows:

$$V\text{feedthough}=Vd2-Vd1=(Vg2-Vg1)*Cpg/(Cpg+Clc+Cst).$$

Vfeedthough represents the feed though voltage on the pixel electrode; Vd2 represents a voltage on the pixel electrode when the thin film transistor is turned off; Vd1 represents a voltage on the pixel electrode when the thin film transistor is turned on; Vg2 represents an output voltage of the gate line when the thin film transistor is turned off; Vg1 represents an output voltage of the gate line when the thin film transistor is turned on; Cpg represents a parasitic capacitance between the gate electrode and the source electrode of the thin film transistor; Clc represents a liquid crystal capacitance of the display device; and Cst represents a storage capacitance between the pixel electrode and the common electrode.

A formula for calculating the storage capacitance between the pixel electrode and the common electrode is: $Cst=\in *S/d$, where Cst represents the storage capacitance between the pixel electrode and the common electrode, $\in$ represents a dielectric constant of a medium between the pixel electrode and the common electrode, S represents an overlapping area of the pixel electrode and the common electrode, and d represents a distance between the pixel electrode and the common electrode.

As can be seen from the above formula, the overlapping area of the pixel electrode and the common electrode may decrease as the area of the pixel electrode decreases, and the feed though voltage on the pixel electrode may increase correspondingly, thereby aggravating acoustic crosstalk and screen flickering occurring on the display device and affecting quality of displayed images.

Comparing with a display panel with high Pixels Per Inch (PPI, i.e., the number of pixels per inch), a display panel with high PPI includes a greater number of pixel units and has a smaller opening area of each pixel unit. Hence, the overlapping area of the pixel electrode and the common electrode in each pixel unit is significantly decreased, and accordingly, acoustic crosstalk and screen flickering are aggravated and the quality of displayed images is affected.

BRIEF SUMMARY OF THE DISCLOSURE

A pixel electrode, an array substrate including the pixel electrode and a display panel including the array substrate are provided according to embodiments of the present disclosure, for increasing a storage capacitance between the pixel electrode and a common electrode in the display panel, alleviating acoustic crosstalk and screen flickering occurring in the display panel, and improving the quality of displayed images.

Technical solutions provided according to the embodiments of the present disclosure are shown as follows.

A pixel electrode is provided, which includes:

a main pixel electrode including a main electrode, a first end portion and a second end portion respectively located at two ends of the main electrode; where the main pixel electrode extends in a first direction; and a first extending portion connected to the first end portion, where the first extending portion extends in a second direction and the first direction intersects with the second direction.

An array substrate is provided, which includes a first substrate and a pixel electrode layer located on a surface of the first substrate, where the pixel electrode layer includes:

multiple sub-pixel regions, where each sub-pixel region includes at least one pixel electrode described above;

multiple thin film transistors, where each thin film transistor includes a gate electrode, a source electrode and a drain electrode, the drain electrode being connected to the pixel electrode;

multiple scanning lines, which are respectively connected to the gate electrodes of the thin film transistors and are for controlling the thin film transistors to be on or off; and multiple data lines, which are respectively connected to the source electrodes of the thin film transistors and are for providing the pixel electrodes with a driving signal via the thin film transistors.

A display panel is provided, which includes:

the array substrate described above;

a color film substrate arranged opposite to the array substrate; and a liquid crystal layer located between the array substrate and the color film substrate.

The pixel electrode according to the embodiment of the present disclosure includes: the main pixel electrode extending in the first direction and the first extending portion, where the main pixel electrode includes the main electrode, and the first end portion and the second end portion respectively located at two ends of the main electrode, the first extending portion extends in the second direction and is connected to the first end portion, and the second direction intersects the first direction. As can be seen from the above, in addition to the main pixel electrode, the pixel electrode according to the embodiment of the present disclosure further includes the extending portion electrically connected to the main pixel electrode. Compared with the conventional pixel electrode, the area of the pixel electrode is increased due to the arrangement of the extending portion. Therefore, for an array substrate where the pixel electrode is applied and a display panel including the array substrate, an overlapping area of the pixel electrode and a common electrode in the display panel is increased; accordingly, the storage capacitance between the pixel electrode and the common electrode in the display panel is increased, and acoustic crosstalk and screen flickering occurring on the display panel are alleviated, thereby improving the quality of displayed images.

BRIEF DESCRIPTION OF THE DRAWINGS

To illustrate the technical solutions according to embodiments of the present disclosure or in the conventional technologies more clearly, drawings to be used in the descriptions of the conventional technologies or the embodiments are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE DISCLOSURE

To make the above features and advantages of the disclosure more obvious and easier to be understood, in the following, specific embodiments of the disclosure are illustrated in detail in conjunction with drawings.

Specific details are set forth in the following descriptions for a better understanding of the disclosure. The disclosure may also be implemented in other ways different from those described herein, and similar extensions can be made by those skilled in the art without departing from the spirit of the disclosure. Therefore, the disclosure is not limited to the embodiments disclosed hereinafter.

Figure 2:
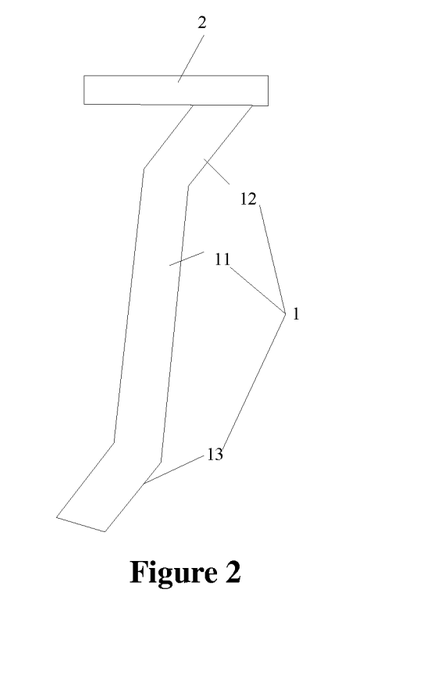
FIG. 2 is a schematic structural diagram of a pixel electrode according to an embodiment of the present disclosure.

A pixel electrode is provided according to an embodiment of the present disclosure. As shown in FIG. 2, the pixel electrode includes a main pixel electrode 1 extending in a first direction and a first extending portion 2. The main pixel electrode 1 includes a main electrode 11, and a first end portion 12 and a second end portion 13 respectively located at two ends of the main electrode 11. The first extending portion 2 is connected to the first end portion 12 and first end portion 12 extends in a second direction. The second direction intersects with the first direction.

It is to be noted that, in an embodiment of the disclosure, the main pixel electrode 1 may be flat or curved, i.e., the main electrode 11, the first end portion 12 and the second end portion 13 may form a flat shape or a curved shape, i.e., the first direction may be a rectilinear direction or a curvilinear direction, which is not limited in the present disclosure and depends on actual situations. It should be noted that, intersecting with the first direction refers to not being parallel to any of a direction along which the first end portion 12 extends, a direction along which the main electrode 11 extends, and a direction along which the second end portion 13 extends; and being parallel to the first direction refers to being parallel to one of the direction along which the first end portion 12 extends, the direction along which the main electrode 11 extends, and the direction along which the second end portion 13 extends.

Figure 3:
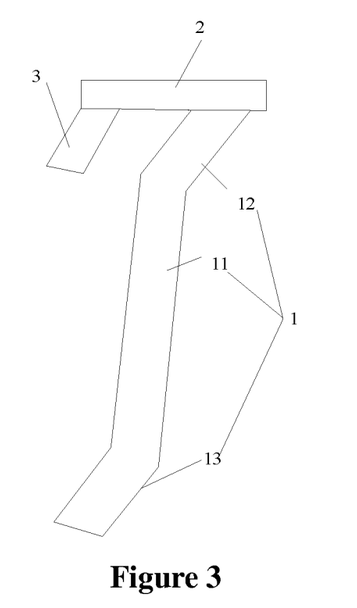
FIG. 3 is a schematic structural diagram of a pixel electrode according to an embodiment of the present disclosure.

Based on the above embodiment, in an embodiment of the present disclosure shown in FIG. 3, the pixel electrode further includes a second extending portion 3 extending in a third direction. The second extending portion 3 is located at a distal end of the first extending portion 2. The second extending portion 3 is provided for further increasing the area of the pixel electrode. The third direction intersects the second direction.

It is to be noted that, in an embodiment of the disclosure, the third direction may intersect with the first direction; and/or the third direction may be parallel to the first direction; which is not limited in the present disclosure and depends on actual situations.

Figure 4:
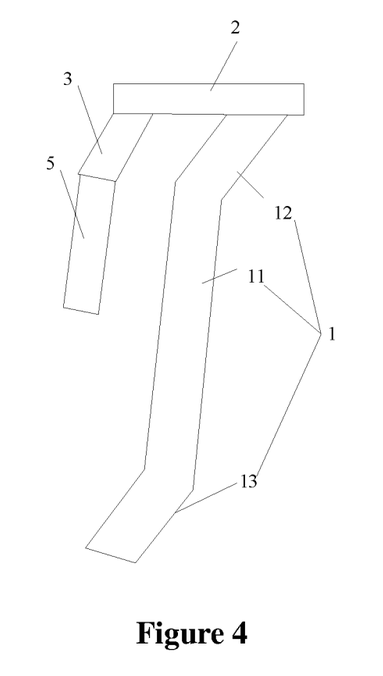
FIG. 4 is a schematic structural diagram of a pixel electrode according to an embodiment of the present disclosure.

Based on the above embodiment, according to an embodiment of the disclosure as shown in FIG. 4, the pixel electrode further includes a fourth extending portion 5 extending in a fifth direction and located at a distal end of the second extending portion 3. The fourth extending portion 5 is provided for further increasing the area of the pixel electrode. The fifth direction intersects the third direction.

It is to be noted that, if the main electrode 11, the first end portion 12 and the second end portion 13 form a curved shape, each of the third direction and the fifth direction is parallel to the first direction; or, each of the third direction and the fifth direction intersects with the first direction; or, one of the third direction and the fifth direction is parallel to the first direction, and the other one of the third direction and the fifth direction intersects with the first direction; which is not limited in the present disclosure.

Specifically, in an embodiment of the present disclosure, the main pixel electrode 1 is curved. The direction along which the first end portion 12 extends is parallel to the direction along which the second end portion 13 extends, and the direction along which the first end portion 12 extends intersects the direction along which the main electrode 11 extends. In the embodiment, in a case that each of the third direction and the fifth direction is parallel to the first direction, the third direction is parallel to the direction along which the first end portion 12 extends and the fifth direction is parallel to the direction along which the main electrode 11 extends.

Figure 5:
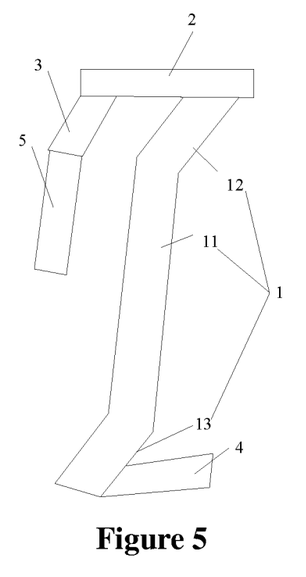
FIG. 5 is a schematic structural diagram of a pixel electrode according to an embodiment of the present disclosure.

Based on any one of the above embodiments, in an embodiment of the present disclosure as shown in FIG. 5, the pixel electrode further includes a third extending portion 4 extending in a fourth direction and connected to the second end portion 13. The third extending portion is provided for further increasing the area of the pixel electrode. It is to be noted that, in an embodiment of the disclosure, the fourth direction may intersect with the first direction; or the fourth direction may be parallel to the first direction; which is not limited in the present disclosure.

Figure 6:
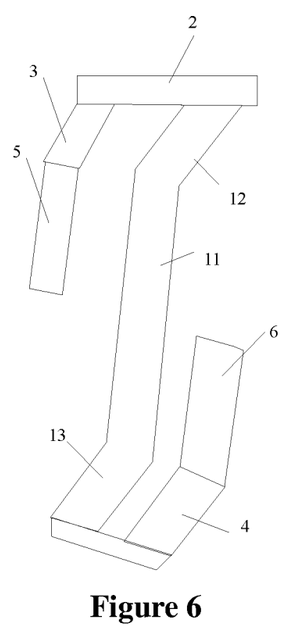
FIG. 6 is a schematic structural diagram of a pixel electrode according to an embodiment of the present disclosure.

Based on the above embodiment, in an embodiment of the present disclosure as shown in FIG. 6, the pixel electrode further includes a fifth extending portion 6 extending in a sixth direction. The fifth extending portion 6 is located at a distal end of the third extending portion 4 and is connected to the third extending portion 4. The fifth extending portion 6 is provided for further increasing the area of the pixel electrode. The sixth direction intersects the fourth direction, and the sixth direction is parallel to the first direction, or the sixth direction intersects with the first direction.

It is to be noted that, in an embodiment of the disclosure, in a case that the main pixel electrode 1 is curved, each of the sixth direction and the fourth direction is parallel to the first direction; or, each of the sixth direction and the fourth direction intersects with the first direction; or, one of the sixth direction and the fourth direction is parallel to the first direction, and the other one of the sixth direction and the fourth direction intersects with the first direction; which is not limited in the present disclosure and depends on actual situations.

It is to be noted that, based on any one of the above embodiments, Mother embodiments of the present disclosure, the pixel electrode may further include other extending portion(s) to increase the area of the pixel electrode, which is not limited in the present disclosure and depends on actual situations.

Figure 7:
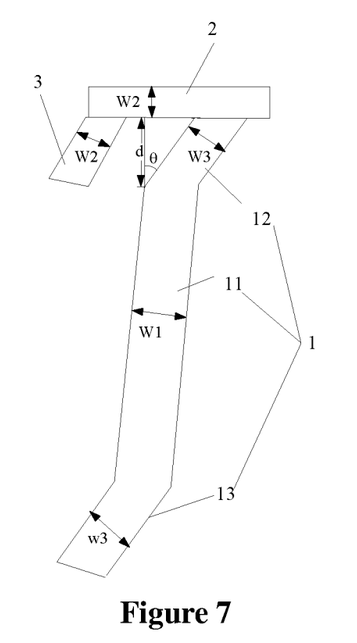
FIG. 7 is a schematic structural diagram of a pixel electrode according to an embodiment of the present disclosure.

In a display panel where the above pixel electrode is applied, the main electrode 11 of the main pixel electrode 1 occupies most of an opening region of each display unit. Based on any one of the above embodiments, in a preferred embodiment of the present disclosure as shown in FIG. 7, a width W2 of each extending portion of the pixel electrode is smaller than a width W1 of the main electrode 11 of the main pixel electrode 1, thereby maximizing the area of the pixel electrode. Further preferably, in a specific embodiment of the present embodiment, the width of the main electrode 11 of the main pixel electrode 1 in the pixel electrode inclusively ranges from 2 nm to 4 nm, and the width of each extending portion of the pixel electrode inclusively ranges from 2 nm to 3 nm.

Based on the above embodiment, in an embodiment of the present disclosure, a width W3 of the first end portion 12 and the second end portion 13 in the main pixel electrode 1 is also smaller than the width W1 of the main electrode 11.

Based on any one of the above embodiments, in an embodiment of the present disclosure, an angle θ between the first end portion 12 and the vertical direction inclusively ranges from 10 degrees to 40 degrees, which is not limited in the present disclosure and depends on actual situations. It is to be noted that, in a display panel where the above pixel electrode is applied, an effective electric field for controlling rotation of liquid crystal molecules is a transverse electric field. If the angle θ between the first end portion 12 and the vertical direction is large, an intensive longitudinal electric field is generated; accordingly, the rotation of the liquid crystal molecules due to the transverse electric field is significantly restrained and the transmittance is low, and the display panel may recover from an uneven display caused by a touch on the surface of the display panel to an even display slowly. Therefore, in a preferred embodiment of the present disclosure, the angle θ between the first end portion 12 and the vertical direction should be set as small as possible within the above-mentioned range for the angle θ.

Based on the above embodiment, in an embodiment of the present disclosure, a distance d of a projection of the first end portion 12 along the vertical direction inclusively ranges from 3 microns to 5 microns, which is not limited in the present disclosure and depends on actual situations. It is to be noted that, in a display panel where the above pixel electrode is applied, an effective electric field for controlling rotation of liquid crystal molecules is a transverse electric field. If the distance d is short, an intensive longitudinal electric field is generated; accordingly, the rotation of the liquid crystal molecules due to the transverse electric field is significantly restrained and the transmittance is low, and the display panel may recover from an uneven display caused by a touch on the surface of the display panel to an even display slowly. Therefore, in a preferred embodiment of the present disclosure, the distance d should be set as small as possible within the above-mentioned range for the distance d.

In summary, in addition to the main pixel electrode 1, the pixel electrode according to the embodiments of the present disclosure further includes the extending portion electrically connected to the main pixel electrode 1. Compared with the conventional pixel electrode, the area of the pixel electrode is increased due to the arrangement of the extending portion. Therefore, for an array substrate where the pixel electrode is applied and a display panel including the array substrate, an overlapping area of the pixel electrode and a common electrode in the display panel is increased; accordingly, the storage capacitance between the pixel electrode and the common electrode in the display panel is increased, and acoustic crosstalk and screen flickering occurring on the display panel are alleviated, thereby improving the quality of displayed images.

Figure 8:
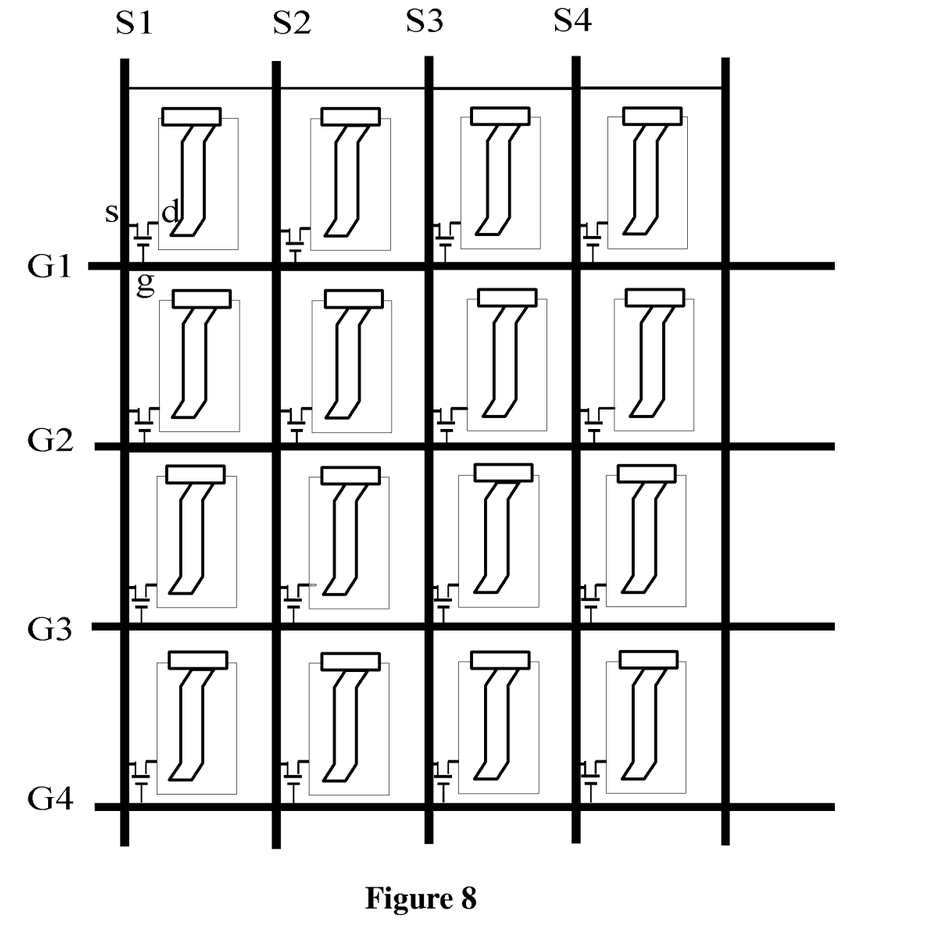
FIG. 8 is a schematic structural diagram of a pixel electrode layer in an array substrate according to an embodiment of the present disclosure.

Correspondingly, an array substrate is further provided according to an embodiment of the present disclosure. The array substrate includes a first substrate and a pixel electrode layer located on a surface of the first substrate. As shown in FIG. 8, the pixel electrode layer includes:

multiple sub-pixel regions, where each of the multiple sub-pixel regions includes at least one pixel electrode according to any one of the above embodiments;

multiple thin film transistors, where each of the multiple thin film transistors includes a gate electrode g, a source electrode s and a drain electrode d, and the drain electrode d is connected to the pixel electrode;

multiple scanning lines G1~G4, which are respectively connected to the gate electrodes g of the multiple thin film transistors and are for controlling the thin film transistors to be on or off; and multiple data lines S1~S4, which are respectively connected to the source electrodes s of the multiple thin film transistors and are for respectively providing the multiple pixel electrodes with a driving signal via the thin film transistors.

In an embodiment of the present disclosure, the array substrate is applied to a display panel with a low PPI, each sub-pixel region of the array substrate may include only one pixel electrode, or may include multiple pixel electrodes, which is not limited in the present disclosure and depends on actual situations.

In another embodiment of the disclosure, the array substrate is applied to a display panel with a high PPI, each sub-pixel region of the array substrate preferably includes only one pixel electrode due to the limit of the area of an opening of each sub-pixel region.

Figure 9:
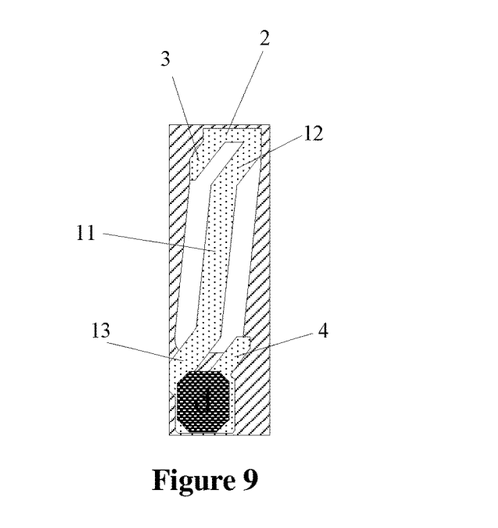
FIG. 9 is a partially enlarged schematic view of one sub-pixel region in an array substrate according to an embodiment of the present disclosure.

It is to be noted that, in an embodiment of the present disclosure as shown in FIG. 9, in a case that the pixel electrode includes the third extending portion 4 extending in the fourth direction and connected to the second end portion 13, and the fourth direction is parallel to the first direction, the third extending portion 4 is connected to the drain electrode of the thin film transistor.

Since the area of each sub-pixel region is very limited in the array substrate applied in the display panel with high PPI, the increase of the area of the pixel electrode is limited if the pixel electrode is enlarged only within the opening of each sub-pixel region. Therefore, in an embodiment of the present disclosure, the extending portion of the pixel electrode partially overlaps a light non-transmissive region between adjacent sub-pixel regions, to furthest increase the area of the pixel electrode. In another embodiment of the present disclosure, the extending portion of the pixel electrode may be completely arranged within the opening of the sub-pixel region, or the extending portion of the pixel electrode may be partially arranged within the opening of the sub-pixel region and partially arranged in the light non-transmissive region between adjacent pixel regions, or the extending portion of the pixel electrode may be completely arranged in the light non-transmissive region between adjacent pixel regions, which is not limited in the present disclosure and depends on actual situations.

It is to be noted that, the light non-transmissive region between two adjacent sub-pixel regions in the array substrate is small, deflection of liquid crystal molecules in the two sub-pixel regions is easily affected if a large portion of the pixel electrode is arranged in the light non-transmissive region between the two adjacent sub-pixel regions, and consequently, light leakage may occur on the display panel in which the array substrate is applied. Therefore, in a preferred embodiment of the present disclosure, the sub-pixel regions are arranged in multiple rows and multiple columns, and the extending portion of the pixel electrode only partially overlaps the light non-transmissive region between adjacent sub-pixel regions arranged in adjacent rows and does not overlap the light non-transmissive region between adjacent sub-pixel regions arranged in adjacent columns.

It is to be noted that, if the extending portion of the pixel electrode partially overlaps the light non-transmissive region between adjacent sub-pixel regions arranged in adjacent rows and does not overlap the light non-transmissive region between adjacent sub-pixel regions arranged in adjacent columns, the pixel electrode preferably does not include the fourth extending portion 5 and the fifth extending portion 6, to fully utilize the opening region of each sub-pixel region to arrange the main pixel electrode 1 of the pixel electrode.

Figure 10:
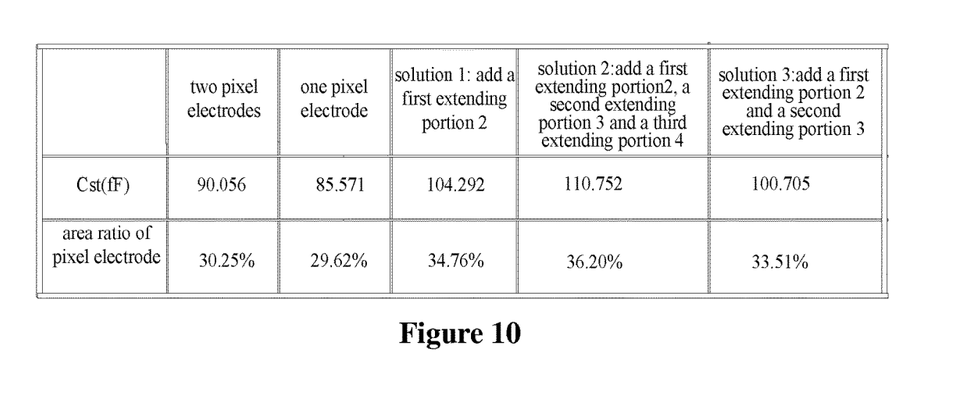
FIG. 10 illustrates a correspondence between an area ratio of a pixel electrode in an array substrate according to an embodiment of the present disclosure and a storage capacitance.
Figure 11:
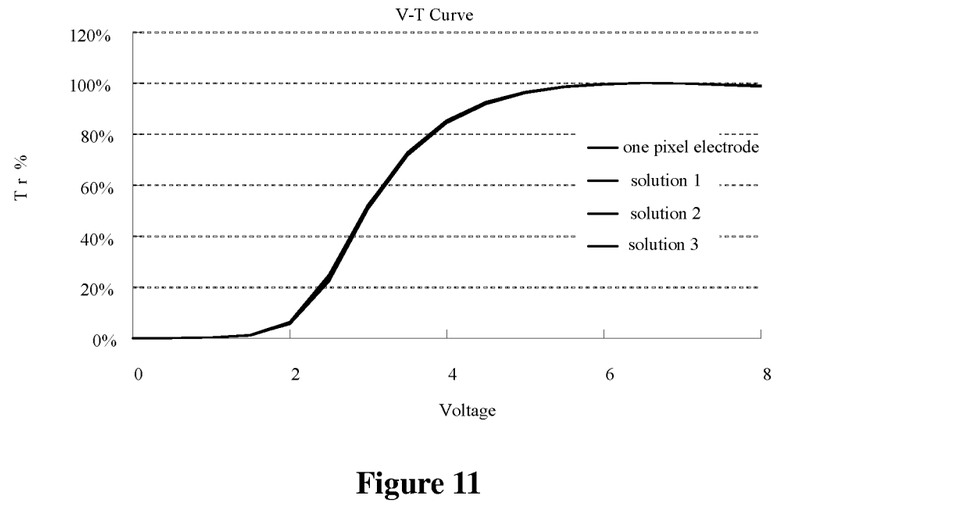
FIG. 11 schematically illustrates VT (voltage transmittance) Curves in case of different area ratios of the pixel electrode in the array substrate shown in FIG. 10.

As shown in FIG. 10 and FIG. 11, if a ratio of the area of the pixel electrode over the area of each sub-pixel region is increased to 33.51%~36.20%, in the array substrate and a display panel including the array substrate, the storage capacitance between the pixel electrode and a common electrode may be increased to 100.7~110.7 femtofarads, while the VT Curve does not significantly change.

Figure 12:
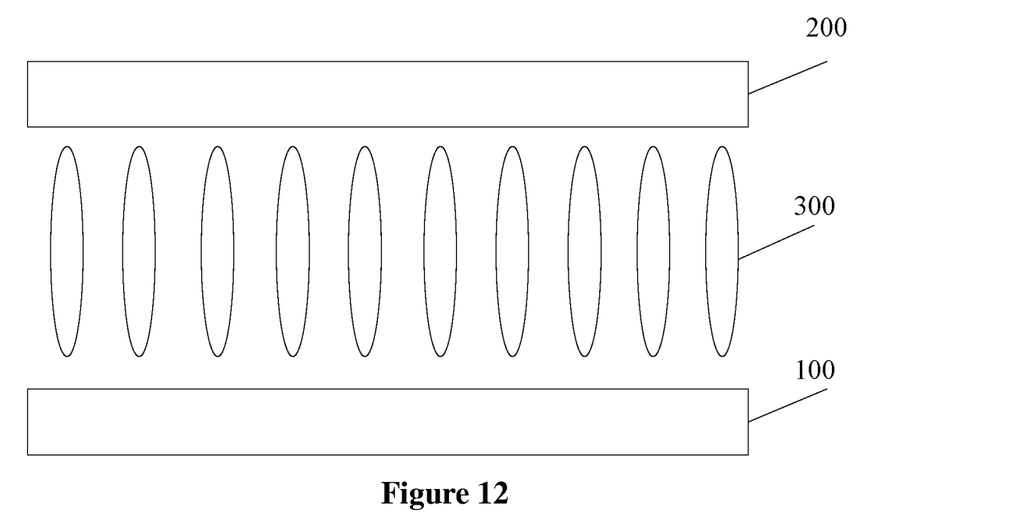
FIG. 12 is a schematic structural diagram of a display panel according to an embodiment of the present disclosure.

A display panel is further provided according to an embodiment of the present disclosure. As shown in FIG. 12, the display panel includes:

an array substrate 100 according to any one of the above embodiments;

a color film substrate 200 arranged opposite to the array substrate 100; and a liquid crystal layer 300 located between the array substrate 100 and the color film substrate 200.

In an embodiment of the present disclosure, liquid crystal molecules in the liquid crystal layer are positive liquid crystal molecules; in another embodiment of the present disclosure, liquid crystal molecules in the liquid crystal layer are negative liquid crystal molecules, thereby increasing the transmittance of the respective sub-pixel regions in the display panel; which is not limited in the present disclosure and depends on actual situations.

As can be seen from the foregoing, in the array substrate and the display panel according to the embodiments of the present disclosure, in addition to the main pixel electrode, the pixel electrode arranged in each sub-pixel region further includes the extending portion electrically connected to the main pixel electrode. Compared with the conventional pixel electrode, the area of the pixel electrode is increased due to the arrangement of the extending portion. Therefore, for an array substrate where the pixel electrode is applied and a display panel including the array substrate, an overlapping area of the pixel electrode and a common electrode in the display panel is increased; accordingly, the storage capacitance between the pixel electrode and the common electrode in the display panel is increased, and acoustic crosstalk and screen flickering occurring on the display panel are alleviated, thereby improving the quality of displayed images.

Respective parts of the specification are described herein in a progressive manner. Each part emphasizes on differences from other parts while, while same or similar contents may be referred to other parts.

With the above description of the embodiments disclosed herein, those skilled in the art can implement or use the present disclosure. Numerous modifications to the embodiments are apparent to those skilled in the art, and the general principle herein can be implemented in other embodiments without deviation from the spirit or scope of the embodiments of the present disclosure. Therefore, the present disclosure is not limited to the embodiments described herein, but is in accordance with the widest scope consistent with the principle and novel features disclosed herein.

What is claimed is:

1. A pixel electrode, comprising:
a main pixel electrode comprising one main electrode extending in a first direction; and
a plurality of extension portions connected with the main electrode, wherein the plurality of extension portions comprises:
a first end portion and a second end portion respectively located at two ends of the main electrode and extending along a same direction, wherein the said same direction is not parallel to the first direction; and
a first extending portion connected to the first end portion and extending in a second direction, wherein the second direction intersects with the first direction, and a width of the first extending portion of the pixel electrode is less than a width of the main electrode in the main pixel electrode.

2. The pixel electrode according to claim 1, further comprising:
a second extending portion extending in a third direction and located at a distal end of the first extending portion, wherein the third direction intersects the second direction.

3. The pixel electrode according to claim 2, wherein the third direction is parallel to the direction the first end portion and the second end portion extend along.

4. The pixel electrode according to claim 2, further comprising:
a third extending portion extending in a fourth direction and connected to a distal end of the second end portion.

5. The pixel electrode according to claim 1, wherein a width of the first end portion and the second end portion of the main pixel electrode each is less than the width of the main electrode in the main pixel electrode.

6. The pixel electrode according to claim 5, wherein the width of the first end portion and the second end portion of the main pixel electrode each is equal to the width of the first extending portion.

7. The pixel electrode according to claim 1, wherein an angle between the first extending portion and the first end portion ranges from 10 degrees to 40 degrees.

8. The pixel electrode according to claim 7, wherein a distance of a projection of the first end portion along the vertical direction inclusively ranges from 3 microns to 5 microns.

9. An array substrate, comprising:
a first substrate and a pixel electrode layer located on a surface of the first substrate, wherein the pixel electrode layer comprises:
a plurality of sub-pixel regions, wherein each of the plurality of sub-pixel regions comprises at least one pixel electrode;
a plurality of thin film transistors, wherein each of the plurality of thin film transistors comprises a gate electrode, a source electrode and a drain electrode, the drain electrode being connected to the pixel electrode;
a plurality of scanning lines, which are respectively connected to the gate electrodes of the thin film transistors and are configured to control the thin film transistors to be on or off; and
a plurality of data lines, which are respectively connected to the source electrodes of the thin film transistors and are configured to provide the pixel electrodes with a driving signal via the thin film transistors;
wherein the pixel electrode comprises:
a main pixel electrode comprising one main electrode extending in a first direction; and
a plurality of extension portions connected with the main electrode, wherein the plurality of extension portions comprises:
a first end portion and a second end portion respectively located at two ends of the main electrode and extending along a same direction, wherein the said same direction is not parallel to the first direction; and
a first extending portion connected to the first end portion and extending in a second direction, wherein the second direction intersects with the first direction, and a width of the first extending portion of the pixel electrode is less than a width of the main electrode in the main pixel electrode.

10. The array substrate according to claim 9, wherein only one pixel electrode is provided in each of the plurality of sub-pixel regions.

11. The array substrate according to claim 10, wherein the second end portion of the main pixel electrode is connected to the drain electrode of the thin film transistor.

12. The array substrate according to claim 11, wherein the pixel electrode comprises:
a second extending portion extending in a third direction and located at a distal end of the first extending portion, wherein the third direction intersects the second direction.

13. The array substrate according to claim 12, wherein the pixel electrode further comprises a third extending portion extending in a fourth direction, a connection portion is connected between the third extending portion and a distal end of the second end portion, the fourth direction is in the same direction as the second end portion, and wherein the third extending portion is connected to the drain electrode of the thin film transistor.

14. The array substrate according to claim 10, wherein the first extending portion of the pixel electrode partially overlaps a light-non-transmissive region between adjacent sub-pixel regions.

15. The array substrate according to claim 14, wherein the plurality of sub-pixel regions are arranged in a plurality of rows, and wherein the first extending portion of the pixel electrode partially overlaps the light-non-transmissive region between adjacent sub-pixel regions arranged in adjacent rows.

16. A display panel, comprising:
an array substrate;
a color film substrate arranged opposite to the array substrate; and
a liquid crystal layer located between the array substrate and the color film substrate;
wherein the array substrate comprises a first substrate and a pixel electrode layer located on a surface of the first substrate, and wherein the pixel electrode layer comprises:
a plurality of sub-pixel regions, wherein each of the plurality of sub-pixel regions comprises at least one pixel electrode;
a plurality of thin film transistors, wherein each of the plurality of thin film transistors comprises a gate electrode, a source electrode and a drain electrode, wherein the drain electrode being connected to the pixel electrode;
a plurality of scanning lines, which are respectively connected to the gate electrodes of the thin film transistors and are configured to control the thin film transistors to be on or off; and
a plurality of data lines, which are respectively connected to the source electrodes of the thin film transistors and are configured to provide the pixel electrodes with a driving signal via the thin film transistors;

wherein the pixel electrode comprises:
- a main pixel electrode comprising one main electrode extending in a first direction; and
- a plurality of extension portions connected with the main electrode, wherein the plurality of extension portions comprises:
  - a first end portion and a second end portion respectively located at two ends of the main electrode and extending along a same direction, wherein the said same direction is not parallel to the first direction; and
  - a first extending portion connected to the first end portion and extending in a second direction, wherein the second direction intersects with the first direction, and a width of the first extending portion of the pixel electrode is less than a width of the main electrode in the main pixel electrode.

17. The display panel according to claim 16, wherein liquid crystal molecules in the liquid crystal layer are positive liquid crystal molecules or negative liquid crystal molecules.

* * * * *

UNITED STATES PATENT AND TRADEMARK OFFICE
CERTIFICATE OF CORRECTION

PATENT NO. : 9,804,460 B2
APPLICATION NO. : 14/869555
DATED : October 31, 2017
INVENTOR(S) : Yangzhao Ma, Poping Shen and Ling Wu It is certified that error appears in the above-identified patent and that said Letters Patent is hereby corrected as shown below:

In the Specification

Column 6, Line 5, "2 nm to 4 nm" should read --2μm to 4μm--; Line 7, "2 nm to 3 nm" should read --2μm to 3μm--

In the Claims

Column 10, Line 34, Claim 14, "claim 10" should read --claim 9--

Signed and Sealed this
Thirty-first Day of July, 2018

Andrei Iancu
*Director of the United States Patent and Trademark Office*